United States Patent
Gangopadhyay (10) Patent No.: US 11,728,099 B2
(45) Date of Patent: Aug. 15, 2023

(54) SUPERCAPACITOR WITH BIASING ELECTRODE

(71) Applicant: Urbix, Inc., Mesa, AZ (US)

(72) Inventor: Palash Gangopadhyay, Gilbert, AZ (US)

(73) Assignee: Urbix, Inc., Dover, DE (US)

(*) Notice: Subject to any disclaimer, the term of this patent is extended or adjusted under 35 U.S.C. 154(b) by 319 days.

(21) Appl. No.: 17/062,439

(22) Filed: Oct. 2, 2020

(65) Prior Publication Data

US 2021/0104369 A1    Apr. 8, 2021

Related U.S. Application Data (60) Provisional application No. 62/910,872, filed on Oct. 4, 2019.

(51) Int. Cl.
| | |
|---|---|
| *H01G 11/32* | (2013.01) |
| *H01G 11/50* | (2013.01) |
| *H01G 11/34* | (2013.01) |
| *H01G 11/08* | (2013.01) |
| *H01G 11/36* | (2013.01) |

(52) U.S. Cl.
CPC ............ *H01G 11/32* (2013.01); *H01G 11/08* (2013.01); *H01G 11/34* (2013.01); *H01G 11/36* (2013.01); *H01G 11/50* (2013.01)

(58) Field of Classification Search
CPC ........ H01G 11/08; H01G 11/32; H01G 11/34; H01G 11/36; H01G 11/50
See application file for complete search history.

(56) References Cited

U.S. PATENT DOCUMENTS

| | | |
|---|---|---|
| 8,652,688 B2 | 2/2014 | Yushin et al. |
| 2012/0045688 A1 | 2/2012 | Liu et al. |
| 2017/0033371 A1 | 2/2017 | Cordova |

FOREIGN PATENT DOCUMENTS

| | | | |
|---|---|---|---|
| EP | 3605572 A1 | * | 2/2020 |
| JP | 2006344845 A | | 12/2006 |
| JP | 2008066682 A | | 3/2008 |
| WO | WO 2018-033912 | | 2/2018 |
| WO | WO 2018/169830 | | 9/2018 |

OTHER PUBLICATIONS

Martins V.L., Improved Performance of Ionic Liquid Supercapacitors by using Tetracyanoborate Anions, ChemElectroChem 2018, 5, 598-604.
International Search Report and Written Opinion dated Jan. 27, 2021 for PCT/US2020/054138.
Response To the Written Opinion and Arguments Supporting the Demand dated Apr. 13, 2021 for PCT/US2020/054138.

\* cited by examiner

*Primary Examiner* — Eric W Thomas
(74) *Attorney, Agent, or Firm* — Fleit Intellectual Property Law; Thomas S. Grzesik; Jon Gibbons (57) ABSTRACT

An asymmetric supercapacitor having a positive electrode, a negative electrode and a biasing electrode disposed between the positive electrode and negative electrode. The biasing electrode accumulates a mass-balanced equivalent amount of charge as the supercapacitor is charging, and an independent voltage applied to the biasing electrode causes charge to be forced to the positive electrode or the negative electrode maintaining an equilibrium in the charge double layer.

20 Claims, 5 Drawing Sheets

SUPERCAPACITOR WITH BIASING ELECTRODE

CROSS-REFERENCE TO RELATED APPLICATIONS

This application claims the benefit of U.S. Provisional Application No. 62/910,872 filed Oct. 4, 2019.

FIELD OF INVENTION

This invention relates to supercapacitors. This invention relates particularly to a supercapacitor having a third electrode that can be used to bias the charge of the positive electrode or the negative electrode and help actively balance supercapacitors in a pack.

BACKGROUND

Supercapacitors are promising energy storage devices due to their high energy density compared to conventional capacitors and high power density compared to batteries. Their ability to store electrical energy efficiently and release electrical energy quickly make them ideally suited for applications requiring a large amount of energy to be stored and delivered in bursts repeatedly, such as hybrid electric vehicles, regenerative braking, and power for memory backup for portable electronic equipment.

A supercapacitor is an electrochemical device conventionally consisting of two electrodes, namely a positive electrode and a negative electrode, separated by an electrolyte and a separator that permits the transfer of ions while keeping the electrodes electrically insulated from each other. The electrolyte may be aqueous, organic or an ionic liquid. The surface of the electrodes is made of porous material, resulting in a higher surface area at the electrode face than a non-porous material. As voltage is applied to a supercapacitor, ions in the electrolyte solution diffuse into the pores of the electrode of opposite charge. Charge accumulates at the interface between the electrodes and the electrolyte, forming two charged layers with an extremely small separation distance.

Given that capacitance increases with the increase of surface area and the decrease in the distance between the two plates, supercapacitors improve on conventional capacitors because of the extremely large surface area and extremely small separation between the double charge layers.

The maximum voltage that can be applied to the electrodes is limited by the decomposition voltage of the electrolyte and the potential difference between the two electrodes within the supercapacitor. Typically, asymmetric supercapacitors are assembled using two dissimilar electrode materials to take full advantage of different electrochemical windows of positive and negative electrodes, which increases the maximum cell operation voltage in the devices. This significantly enhances the energy density. The standard configuration of today's supercapacitors uses activated carbon as the active electrode material and organic solvent as the electrolyte.

Supercapacitors of known design suffer narrow operating voltages of up to only about 1-3.4 V. To achieve higher operating voltages, single-cell supercapacitors are combined in series, or stacked. However, known supercapacitors have as much as +/−20% variance in capacitance, resistance and leakage current. These differences are cumulative when single-cell supercapacitors are stacked, creating an imbalance in the cell voltages and potential overvoltages. To manage this imbalance, an external balancing circuit is commonly placed in parallel with the stack in the positive electrode-negative electrode circuit. Unfortunately, external biasing circuits suffer severe energy loss due to internal resistance and consequent voltage drop between the balancing circuit and the supercapacitors. Some cell assemblies use internal current collectors, which then connect to a third electrode that allows grounding or connects to MOSFETS to control the imbalances. A simpler supercapacitor with a higher operating voltage and without energy loss is desired.

SUMMARY OF THE INVENTION

This invention is supercapacitor having a positive electrode, a negative electrode and a third electrode referred to herein as a biasing electrode. The biasing electrode is physically disposed between the positive electrode and negative electrode.

The voltage applied to the biasing electrode is independent of the voltage applied to the positive electrode and negative electrode. That is, the biasing electrode circuit is not electrically connected to the circuit of the positive electrode and negative electrode. The biasing electrode accumulates and stores a mass-balanced equivalent amount of charge as the supercapacitor is charging. Because the biasing electrode is not a part of the positive electrode-negative electrode circuit, this collected charge is not depleted during a normal discharge cycle. As the positive electrode and negative electrode are depleted, the independent voltage applied to the biasing electrode causes charge within the supercapacitor to be forced to the positive electrode or the negative electrode that is more degraded, typically to the positive electrode, to maintain an equilibrium in the charge double layer. This stability in charge equates to improved stability in the electrode and increased operating voltages. In one embodiment, this supercapacitor has an operating voltage of about 5.5-7.4V in a coin cell form factor.

A method of making a coin cell supercapacitor having the biasing diode is provided.

DETAILED DESCRIPTION OF THE INVENTION

This invention is supercapacitor having a positive electrode, a negative electrode, and a third electrode referred to herein as a biasing electrode. See FIGS. 1 and 2. In these figures, the positive electrode and biasing electrode are depicted using different hatching to differentiate function, but in most embodiments they are made of the same material. As used herein, "material" for the electrodes may comprise a single ingredient or a combination of ingredients. The biasing electrode physically resides between the positive electrode and negative electrode, and acts as a current collector and an energy storage electrode. The voltage applied to the biasing electrode is independent of the voltage applied to the positive and negative electrodes and can be either positive or negative. That is, the biasing electrode circuit is not electrically connected to the circuit of the positive electrode and negative electrode. This is in contrast to stacked capacitors of the prior art, in which a voltage from a common source is applied to each of the intermediary positive and negative electrodes in the stack.

In a high-power storage system, the biasing electrode can also be used as the active balancing circuit by applying a small feedback loop voltage. The voltage (positive or negative) can adjust the over- or under-voltage at the cell level and enable internal biasing of cells, which is more efficient than external biasing.

The positive electrode and biasing electrode are preferably made of a combination of activated charcoal and graphene nanoplatelets ("GNP") in a single layer. See Table 1. The negative electrode is preferably made of a combination of activated charcoal, GNP and lithiated graphite. In some cases, other carbon-based materials such as porous carbon, carbon nanotubes, multilayer graphene, and graphene oxide, referred to herein as a carbon allotropes, may be employed in the electrodes owing to their high surface area and electrostatic charge-storage mechanisms at electrode/electrolyte interfaces. Metal oxides may also be employed in the electrodes.

TABLE 1

|  | Positive electrode | Biasing electrode | Negative electrode | Slurry liquid or electrolyte | Assembly ink |
|---|---|---|---|---|---|
| Electrodes |  |  |  |  |  |
| Activated charcoal | 60 wt % | 60 wt % | 30 wt % |  |  |
| GNP | 30 wt % | 30 wt % | 20 wt % |  |  |
| Lithiated graphite | 0 | 0 | 10-40 wt % |  |  |
| PVA | 4 wt % | 4 wt % | 4 wt % |  |  |
| cellulose | 6 wt % | 6 wt % | 6 wt % |  |  |
| Electrolyte |  |  |  |  |  |
| (Pip1, 4)B(CN4) |  |  |  | 30 wt % |  |
| EMI:TFSI |  |  |  | 40 wt % |  |
| EMIBF4 |  |  |  | 30 wt % |  |
| Slurry Liquid |  |  |  |  |  |
| Acetone |  |  |  | 25 wt % |  |
| Water |  |  |  | 5 wt % |  |
| Ethyl acetate (or lactate) |  |  |  | 70 wt % |  |
| Assembly Ink |  |  |  |  |  |
| Printed Film |  |  |  |  |  |
| ethyl lactate |  |  |  |  | 70 wt % |
| ethyl acetate |  |  |  |  | 20 wt % |
| ethylene glycol acetate |  |  |  |  | 10 wt % |
| OR |  |  |  |  |  |
| Spray film |  |  |  |  |  |
| acetone |  |  |  |  | 80 wt % |
| ethyl lactate |  |  |  |  | 20 wt % |
| binder (methyl- or nitro-cellulose) |  |  |  |  | 5-8 wt % |
| GNP |  |  |  |  | 10-15 wt % |

A person of skill in the art will recognize that the weight percentages given in Table 1 may vary by ±10 wt %, depending on the desired operating parameters and cost.

One embodiment of the process for making a single coin cell of the present invention involves generally harvesting lithiated graphite from Li-ion batteries and making coins from the graphite which are then soaked in the desired electrolyte. In this way the electrolyte is absorbed into the electrodes, in contrast to conventional processing in which additional electrolyte is added during cell assembly.

To harvest lithiated graphite from Li-ion batteries, the Li-ion battery is fully charged by charging it repeatedly and leaving it charging at its nominal charge setting for at least 24 hours. The graphite electrodes on the copper current collectors are separated, washed with isopropyl alcohol, and dried under inert gas flow. Once dry, the lithiated graphite can be scraped from the copper current collectors.

The electrodes for the supercapacitor are prepared by measuring and mixing dry ingredients. Then, a slurry is prepared by mixing the mixed dry ingredients with binders and thickeners, such as polyvinyl acetate (PVA) and cellulose, in a solvent solution. Typically the solvent solution is an acetone:water:ethyl alcohol solution, but other solutions may suffice such as iso-propyl alcohol, dimethyl sulfoxide, dimethyl formamide, diethyl ketone and mixtures thereof. For example, 100 g of solids is mixed with a 25:5:70 mixture of acetone:water:ethyl alcohol solution.

Figure 3A:
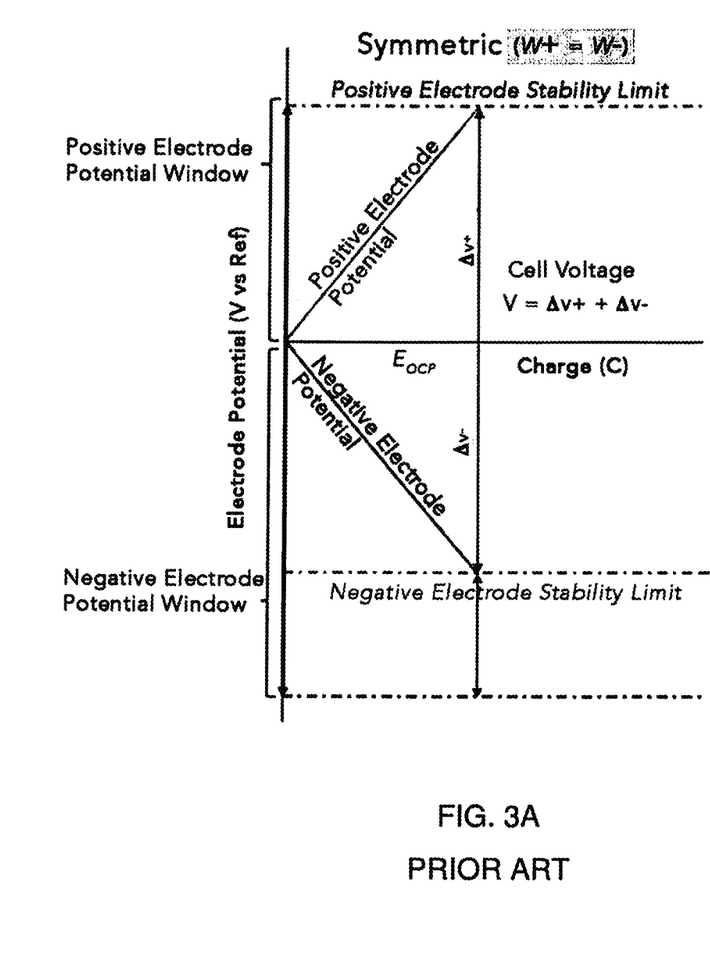
FIG. 3A is a graph illustrating the relationship between electrode potentials, voltage, and charge in a conventional symmetric supercapacitor of the prior art.
Figure 3B:
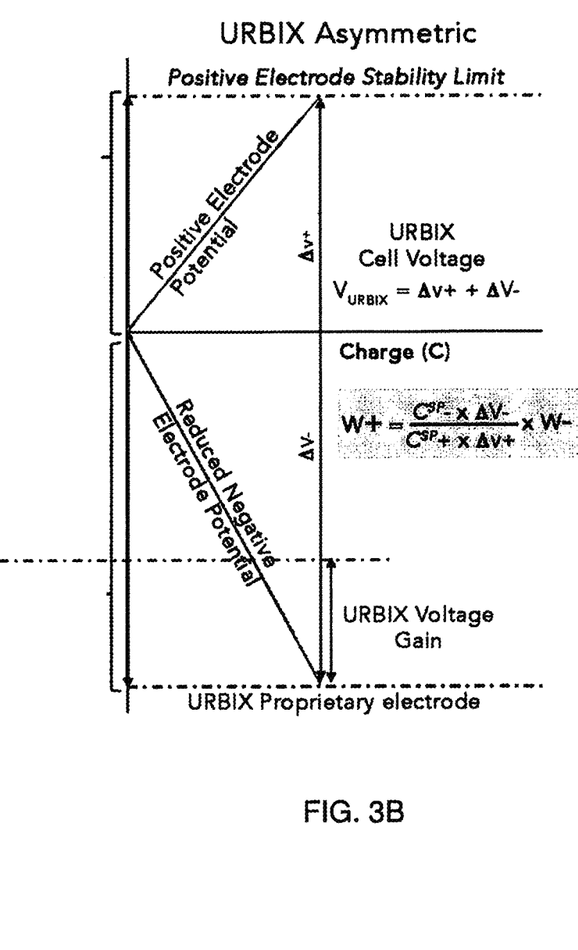
FIG. 3B is a graph illustrating the relationship between electrode potentials, voltage, and charge in the asymmetric supercapacitor of the present invention.
Figure 4:
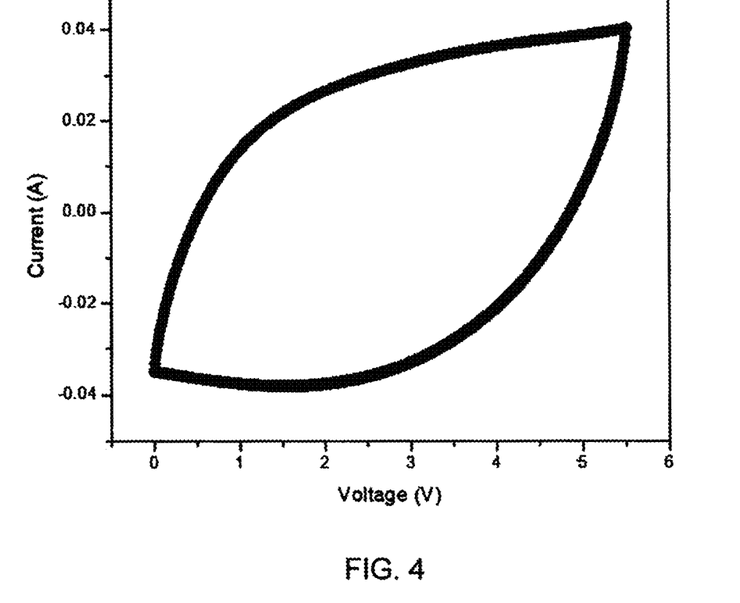
FIG. 4 is a cyclic voltammogram of a representative supercapacitor of the present invention at 0.01V/s.
Figure 5:
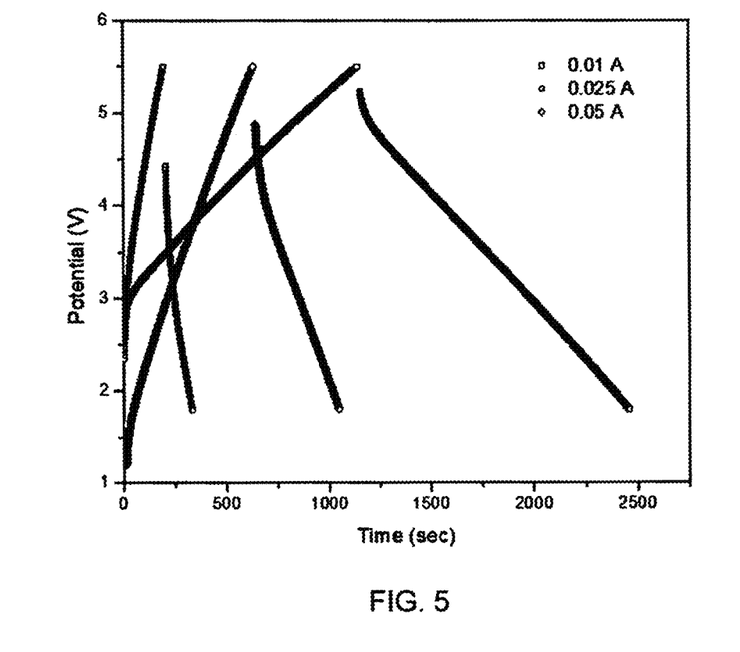
FIG. 5 is a graph of the charge-discharge of the supercapacitor of FIG. 4 at different constant current rates.

The preferred embodiment of the supercapacitor is gravimetrically asymmetric, with a different amount of graphene in each of the positive and negative electrodes, as opposed to different materials in each electrode as known in materially-asymmetric supercapacitors. This enables the weight ratio of positive electrode:negative electrode to be modulated. One of the key advantages of this asymmetric design is that by modulating the weight ratio of the two electrodes, in particular by reducing the weight of the negative electrode, one can reduce the operating voltage and increase the capacitance if need be to suit the application. See FIGS. 3A and 3B. For example, in some embodiments the negative electrode includes of 40 wt % of lithiated graphite for a 7.5V supercapacitor, 25% lithiated graphite for a 5.65V supercapacitor and 10% lithiated graphite for a ~4.5V supercapacitor.

The slurry is dried under inert gas flow to evaporate solvents and form a consistent dough. The dough is pressed or rolled into flat sheet and left to dry. Once dry, the dough is compressed by putting it through a roller. Electrodes are cut from the dried dough into desired shapes, such as round coins of the 2430 and 2032 coin cell form factor and immersed, or otherwise put in contact with, in the electrolyte for 24 hours. The electrolyte is made by mixing the ionic liquids in desired proportions. Table 1 discloses an electrolyte of 30 wt % tetracyanoborate N-butyl-N-methylpiperidinium (Pip1, 4)B(CN4), 40wt % I-Ethyl-3-methylimidazolium bis-(trifluoromethylsulfonyl)-imide (EMI:TFSI), and 30 wt % 1-Ethyl-3-methylimidazolium tetrafluoroborate (EMIBF4). Other ionic solutions will suffice.

Figure 1:
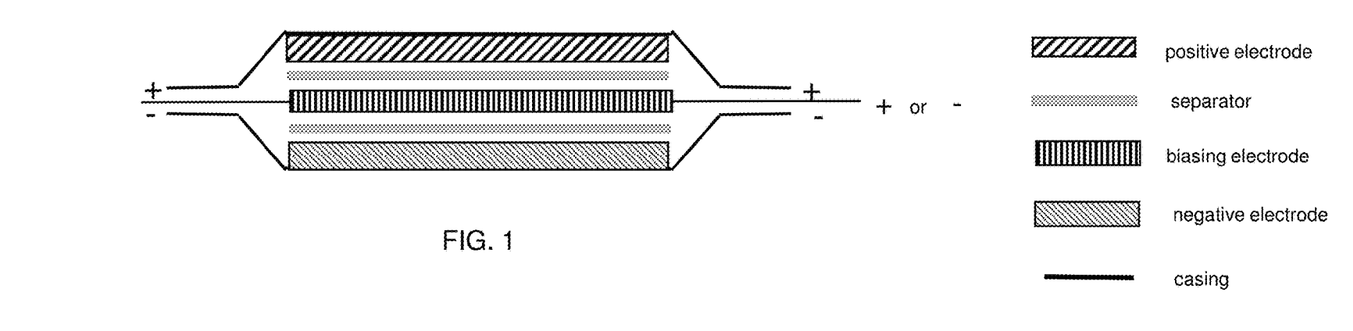
FIG. 1 is a schematic illustration of a cross-section of a single-cell supercapacitor of the present invention.
Figure 2:
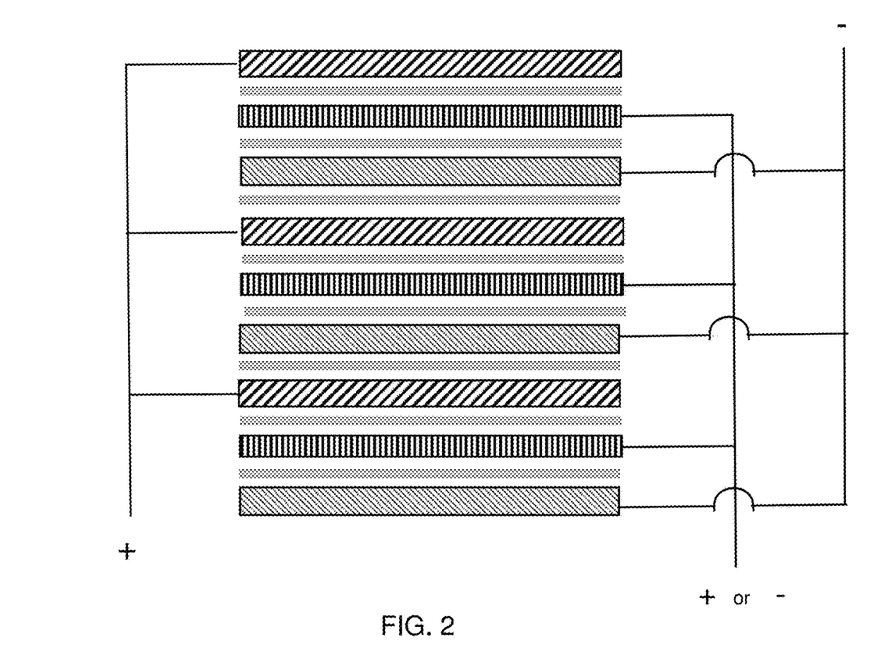
FIG. 2 is a schematic illustration of a cross-section of a stacked supercapacitor of the present invention.

The electrodes are assembled in a single cell or stacked cell arrangement as desired, as shown in FIGS. 1 and 2, with a separator between each electrode. Each separator provides a physical barrier between the electrodes to prevent shorting and ideally exhibits high porosity to allow the flow of electrolyte for charging and discharging. Separator materials include micro-porous membranes such as polyethylene and polypropylene, polyvinylidene fluoride (PVDF), and cellulose, even ordinary white printer paper.

The components are encased in protective metal casings, typically made of polymer laminated aluminum or aluminum alloys. For better electron transfer between the electrodes and metal casings, inside of the metal casings are coated with a thin film of assembly ink, by printing, brushing, rolling or spray painting. The film is a suspension of a binder and GNP in solution of ethyl lactate, ethyl acetate and ethylene glycol for ink-jet printing, or a solution of acetone and ethyl lactate for spray coating. Once assembled, the casing edges are crimped together to finalize the supercapacitor.

All parameters assessed to characterize the performance of supercapacitors depend on a large number of factors, such as chemical composition, pore structures, mass, thickness, configuration and characterization techniques, instrumentations and protocols among others. FIGS. 4, 5, 6B, 8 and Table 2 sets forth a set of representative data of the present device, highlighting its charge discharge characteristics and time dependent evolution of capacitive storage within this asymmetric quasi-hybrid system.

Figure 8:
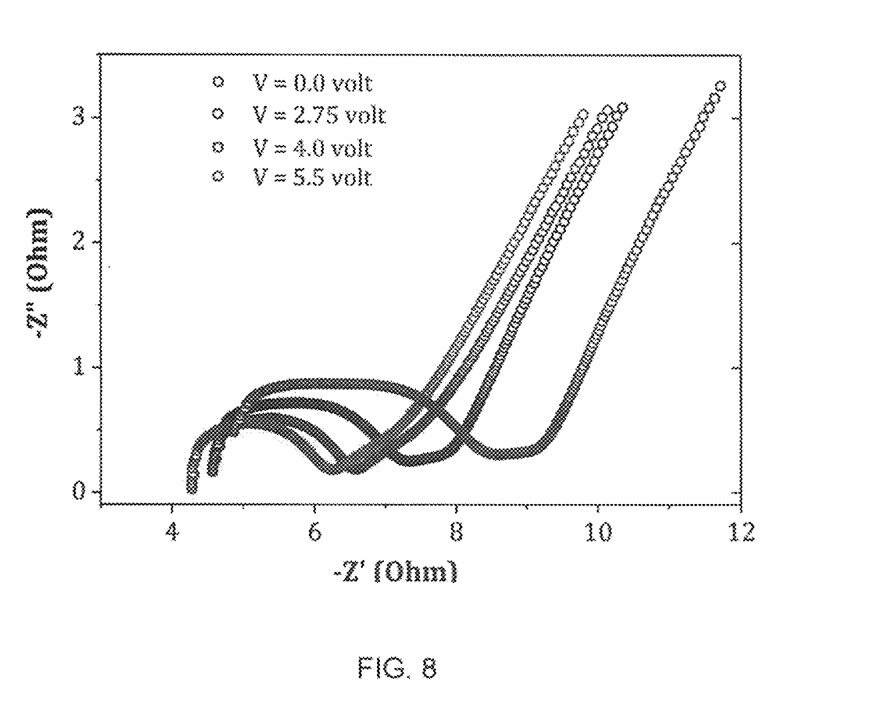
FIG. 8 is a graph of the electrochemical impedance spectra at different states of charge.

Unlike any fast charging symmetric carbon-carbon supercapacitor of the prior art, in the present gravimetrically asymmetric supercapacitor the redistribution of charges during charging and discharging by diffusion or within the Helmholtz layer is highly dynamic and plays a key role in understanding and optimizing the design parameters of the supercapacitors. All data shown in FIGS. 4, 5, 6B and Table 2 are collected directly from supercapacitor coin cells as 2-electrode measurements and treated accordingly to compute capacitance and equivalent series resistance ("ESR") values. The electrochemical impedance spectroscopy data shown in FIG. 8 are collected from 3-terminal (positive, negative and biasing electrodes) coin cell measurements, illustrating the dynamic nature of the interactions at rest and at different states of charge process in the present asymmetric cells.

Figure 6A:
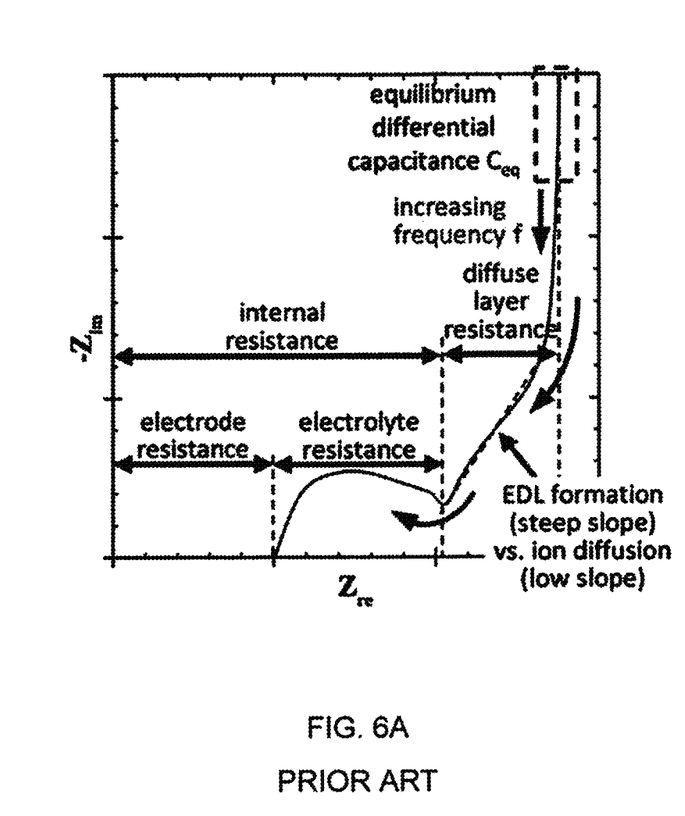
FIG. 6A is a graph of the prior art illustrating general physical interpretations of Nyquist plots for electrical double layer capacitor ("EDLC") electrodes and devices.
Figure 6B:
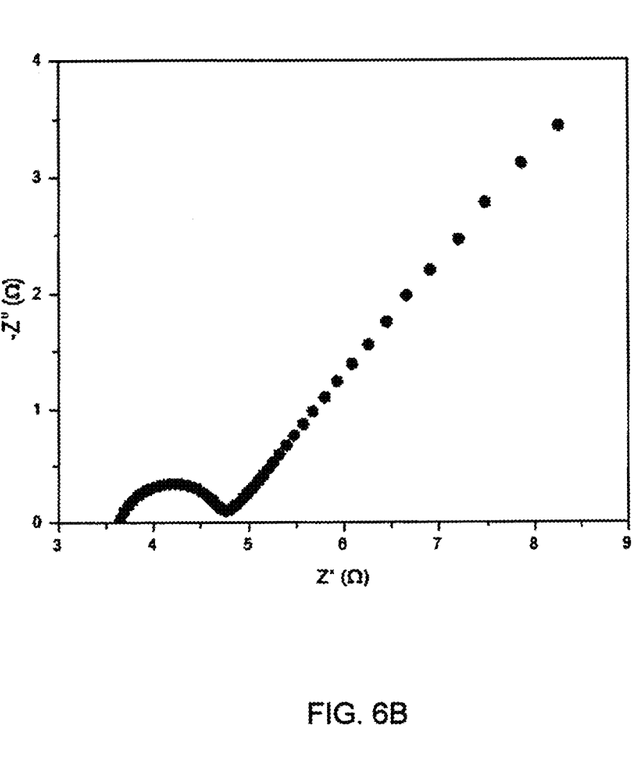
FIG. 6B is a Nyquist plot of the supercapacitor of FIG. 4.
Figure 7:
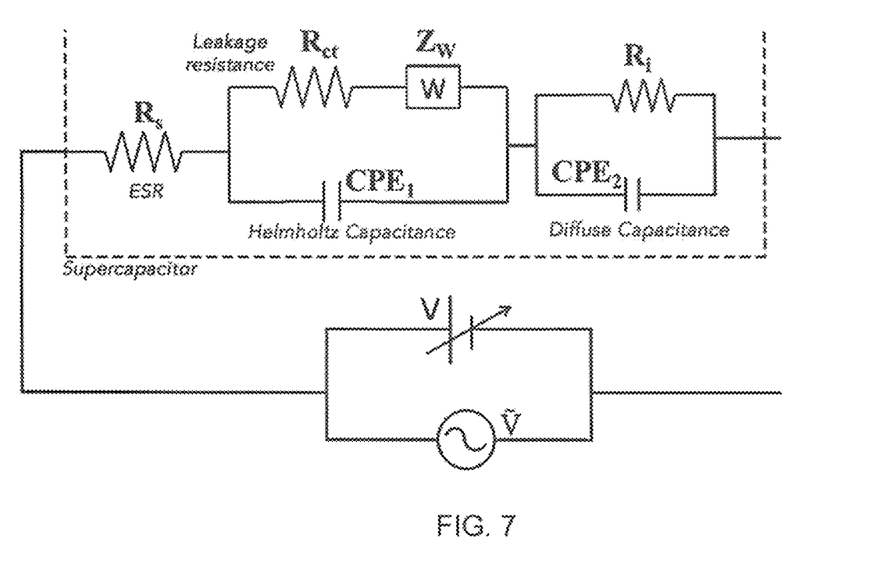
FIG. 7 is a diagram of an equivalent circuit of the supercapacitor of FIG. 4.

The low frequency tail of the Nyquist plot shown in FIG. 6B is in between 45° to 90° from real impedance axis Z', which indicates the device stores charge based on both EDLC mechanism and pseudocapacitive mechanism. The diameter of the semicircle of FIG. 6B corresponds to the charge transfer resistance at the electrode-electrolyte interface. For the device in FIG. 6B, the charge transfer resistance is about 1.0 Ω. At high frequency, the intersection of semicircle and real impedance axis reveals device intrinsic resistance, including electrode materials, contact resistance of casings and electrodes, casing resistance. FIG. 6B and 8 show the observed intrinsic resistance is quite consistent among devices, in the range of 3.0-5.0 Ω. FIG. 8 reveals changes in charge formation and charge transport at electrode-electrolyte interface. The steep slope of diffuse layer (at rest, V=0.0 V) becomes lower upon applied voltage, indicating ions rapidly diffuse onto electrode surface. At 5.5 V, the slope of diffuse layer is almost 0, implying ions are fully occupied electrode surface. As higher external voltage is applied, diameter of the semicircle (device at rest, V=0.0 V) is increasing and a single semicircle transforms to a superimposed image of two semicircles, indicating two different resistive charge transfer zones. Operational temperature of these supercapacitors is within the range of −40 to 70 degree C.

TABLE 2

| | | | | |
|---|---|---|---|---|
| Dimension (D × H) | | 24.5 × 7.3 | | mm |
| Unit volume | | 3.44148 × 10$^{-6}$ | | m$^3$ |
| Nominal unit weight | | 0.007 | | kg |
| Test temperature | | 25 | | ° C. |
| Test voltage | | 5.5 | | V |
| Connection resistance | | 0.3 | | Ω |
| Constant discharge current | 0.01 | 0.025 | 0.05 | A |
| Capacitance | 4.15 | 3.68 | 2.08 | F |
| ESR_DC | 28.38 | 24.79 | 21.39 | Ω |
| Energy | 0.0174 | 0.0155 | 0.0087 | Wh |
| Power | 0.2665 | 0.3051 | 0.3536 | W |
| Volumetric energy density | 5,064.67 | 4,316.89 | 2,533.30 | Wh/m$^3$ |
| Volumetric power density | 77,426.11 | 85,148.78 | 102,748.70 | W/m$^3$ |
| Gravimetric energy density | 2.49 | 2.21 | 1.25 | Wh/kg |
| Gravimetric power density | 38.07 | 43.59 | 50.52 | W/kg |

The following describes the making of a supercapacitor.

Supercapacitor Composition:

Lithiated Graphite: Harvested from fully charged 4.2V lithium-ion battery anode (NMC-Graphite). A 7 Ah, 4.2 V NMC—Graphite battery, would have 0.05 G of Li/G of cathode material and ~8 G of lithium/G of electrolyte and generally would contain (in average) 70 G of cathode and 24 G of graphite. Before harvesting the battery (cell) must be charged repeatedly and left for charging at its nominal charge setting for 24 hours. One must be cautious while disassembling a charged battery. Do not short the battery electrodes during this process, and use overhead inert gas flow. Once safely removed, separate the graphite electrodes (on current copper collectors) and wash with IPA before drying under positive inert gas flow. Scrape off the lithiated graphite from copper, and from each battery, one should be able to gather ~15 G of lithiated graphite. This much lithiated graphite is enough for ~ten supercapacitors.

Activated Charcoal: Activated charcoal was used as purchased.

Graphene additive: Graphene was exfoliated from expanded graphite, and both GNP and multilayer graphene can be used for electrodes.

Electrode mixture: Positive and biasing electrodes: Activated charcoal: GNP: partially hydrolyzed PVA (low molecular weight): methyl cellulose: 60:30:4:6 (60:35:3:2 also works).

Negative electrode: Activated charcoal: GNP: Lithiated graphite: partially hydrolyzed PVA (low molecular weight): methyl cellulose: 30: 20: 40: 4: 6 (% of lithiated graphite can be modulated between 10-40% to modulated final voltage). 40 wt % of lithiated graphite was used for 7.5V supercapacitor, 25% lithiated graphite was used for 5.65V supercapacitor and 10% lithiated graphite was used ~4.5V supercapacitor.

Slurry: Prepare a slurry of ~100 G of solid in 25:5:70 mixture of acetone: water: ethyl acetate (or lactate) using vacuum mixture. At max rpm, mix the slurry for at least 3 hours. Evaporate solvents until you can achieve a consistent dough. Press it to form a smooth flat and wet dough. Do let it dry.

Compressor: Pass it through the roller to achieve desired thickness (target thickness ~1 mm) at 130° C. This should provide a relatively flat sheet, do not let it dry completely. The resulting sheet of material should retain wet rubbery consistency. Cut off the edges and use the sheet to cut electrodes. Once cut, immediately immerse the electrodes into electrolyte.

Electrolyte: (Pip1,4)B(CN)4 : EMI:TFSI : EMIBF4::30: 40:30. Mix well. Wet electrodes and separators well by immersing them in the electrolyte for 24 hrs. No need to add additional electrolyte during formation.

Separator: Ordinary white (not died, not blue colored) printing paper was used as separator.

Assembly ink: Solvent mixture (Printing): Ethyl lactate, ethyl acetate and ethylene glycol acetate: 70:20:10.

Solvent mixture (spray or other coating methodology): Acetone, ethyl lactate: 80:20.

Binder: methylcellulose or nitrocellulose. Note: Methylcellulose has better binding properties, but nitrocellulose offers better conductivity.

Graphene 2.5-30 wt % depending on application and size of the GNP. For supercapacitors, 10-15 wt % works great.

Disperse powdered cellulose binder (methylcellulose was used for all supercapacitors) in IPA as 10 mG/mL concentration and vacuum mix at max rpm for 2 hours. Add 150 mG/mL graphene (GNP), and vacuum mix at max rpm for 4 hours. This should provide a uniform suspension, let it settle and filter. If the suspension doesn't precipitate, use sodium chloride solution (15% wt/wt) to dilute before filtration. Dry, harvest the powder and grind in mortar and pestle (or use the mill). If you are using the mill, use 15 wt % dry ethanol as grinding medium.

Add the dry powder into the solvent mixture of choice, and vacuum mix for 4 hours at max rpm. Use Assembly ink to coat appropriate sides of the metal casings. A small paint brush was used for coating. Place the electrodes before the Assembly ink is completely dried.

Formation: Use the crimping machine to assemble the supercapacitors. Solder metal casings if required for supercapacitors with biasing electrodes.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the appended claims.

I claim:

1. A supercapacitor comprising:
   a positive electrode;
   a negative electrode; and
   a biasing electrode disposed between the positive electrode and the negative electrode, wherein the biasing electrode is configured to store a charge.

2. The supercapacitor of claim 1 wherein a first voltage applied to the biasing electrode is not electrically connected to a circuit of the positive electrode and negative electrode.

3. The supercapacitor of claim 1 wherein the positive electrode and biasing electrode comprise the same material.

4. The supercapacitor of claim 1 wherein the positive electrode comprises a first material and the negative electrode comprises the first material, with a different amount of the first material in each of the positive and negative electrodes such that the weight ratio of the positive electrode to the negative electrode is not 1:1.

5. The supercapacitor of claim 4 wherein the first material comprises a carbon allotrope.

6. The supercapacitor of claim 4 wherein the first material comprises activated charcoal and graphene nanoplatelets.

7. The supercapacitor of claim 4 wherein the negative electrode further comprises a second material that is different from the first material.

8. The supercapacitor of claim 7 wherein the second material in the negative electrode comprises lithiated graphite.

9. The supercapacitor of claim 8 wherein the lithiated graphite in the negative electrode is about 10-40 wt %.

10. The supercapacitor of claim 8 wherein an amount of lithiated graphite in the negative electrode is sufficient to produce an operating voltage greater than 4.5 V.

11. The supercapacitor of claim 1, wherein the biasing electrode is further configured to store a mass-balance equivalent amount of charge as the supercapacitor is charging.

12. A supercapacitor comprising:
a positive electrode;
a negative electrode; and
a biasing electrode disposed between the positive electrode and the negative electrode wherein
wherein the positive electrode comprises a first material and the negative electrode comprises the first material, with a different amount of the first material in each of the positive and negative electrodes such that the weight ratio of the positive electrode to the negative electrode is not 1:1.

13. The supercapacitor of claim 12 wherein the first material is a carbon allotrope.

14. The supercapacitor of claim 12 wherein the first material comprises activated charcoal and graphene nanoplatelets.

15. The supercapacitor of claim 12 wherein the negative electrode further comprises lithiated graphite in an amount sufficient to produce an operating voltage greater than 4.5V.

16. A supercapacitor comprising:
a positive electrode;
a negative electrode; and
a biasing electrode disposed between the positive electrode and the negative electrode and configured to store a charge, wherein a first voltage applied to the biasing electrode is independent of a second voltage applied to the positive electrode and negative electrode.

17. The supercapacitor of claim 16 wherein:
the positive electrode and biasing electrode each comprise:
activated charcoal in a range of 50-70 wt %; and
graphene nanoplatelets in a range of 20-40 wt %; and
the negative electrode comprises:
activated charcoal in a range of 20-40 wt %;
graphene nanoplatelets in a range of 10-30 wt %; and
lithiated graphite in a range of 10-40 wt %.

18. The supercapacitor of claim 16 wherein the positive electrode and biasing electrode each comprise 60 wt % activated charcoal and 30 wt % graphene nanoplatelets.

19. The supercapacitor of claim 18 wherein the negative electrode comprises 30 wt % activated charcoal, 20 wt % graphene nanoplatelets and 10-40 wt % lithiated graphene.

20. The supercapacitor of claim 16 wherein:
the positive electrode and biasing electrode each comprise:
activated charcoal at about 60 wt %; and
graphene nanoplatelets at about 30 wt %; and
the negative electrode comprises:
activated charcoal at about 30 wt %;
graphene nanoplatelets at about 20 wt %; and
lithiated graphite at about 10-40 wt % depending on a desired operating voltage.

* * * * *